(12) United States Patent
Shepelev et al.

(10) Patent No.: US 11,556,195 B2
(45) Date of Patent: Jan. 17, 2023

(54) INPUT-DISPLAY DEVICE WITH SHARED MEMORY

(71) Applicant: Synaptics Incorporated, San Jose, CA (US)

(72) Inventors: Petr Shepelev, Campbell, CA (US); Daisuke Ito, Tokyo (JP); Toshifumi Ogata, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 141 days.

(21) Appl. No.: 16/912,624

(22) Filed: Jun. 25, 2020

(65) Prior Publication Data

US 2021/0405794 A1 Dec. 30, 2021

(51) Int. Cl.
*G06F 3/041* (2006.01)
*G09G 3/3208* (2016.01)
*G06F 3/044* (2006.01)

(52) U.S. Cl.
CPC ............ *G06F 3/0412* (2013.01); *G06F 3/044* (2013.01); *G06F 3/0416* (2013.01); *G09G 3/3208* (2013.01); *G09G 2354/00* (2013.01)

(58) Field of Classification Search
CPC combination set(s) only.
See application file for complete search history.

(56) References Cited

U.S. PATENT DOCUMENTS

| 2009/0251430 | A1* | 10/2009 | Hung | G06F 3/04166 345/173 |
| 2018/0366056 | A1* | 12/2018 | Tang | G09G 3/3208 |
| 2020/0111430 | A1 | 4/2020 | Saito | |
| 2021/0056333 | A1* | 2/2021 | Cheng | G06F 3/041661 |

* cited by examiner

*Primary Examiner* — Yaron Cohen
(74) *Attorney, Agent, or Firm* — Ferguson Braswell Fraser Kubasta PC

(57) ABSTRACT

An input-display device includes a display screen on a display substrate and capacitive sensing electrodes for capacitive sensing in a sensing region of the display screen. The input-display device also includes a touch and display driver integration (TDDI) circuit on the display substrate, the TDDI circuit including a source driver circuit driving a subset of display pixels of the display screen based on a processed image signal, and an analog frontend for the capacitive sensing, interfacing with the capacitive sensing electrodes to obtain touch signals. The input-display device also includes an image processing circuit generating the processed image signal based on a received image signal and a display parameter, a touch processing circuit generating a touch output signal by processing the touch signals based on instructions of a touch firmware, and a memory physically separate from the display substrate, the memory storing the display parameter and the touch firmware.

14 Claims, 9 Drawing Sheets

INPUT-DISPLAY DEVICE WITH SHARED MEMORY

TECHNICAL FIELD

The described embodiments relate generally to electronic devices, and more specifically, to the use of a shared memory for the operation of an input-display device.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are often combined with display devices to operate as input-display devices (such as touch screens integrated in cellular phones).

In an input-display device, the proximity sensor device may require memory, e.g., for the storage of a firmware. Further, in an input-display device, the display device may also require memory, e.g., for the storage of display parameters.

SUMMARY

In general, in one aspect, one or more embodiments relate to an input-display device, comprising: a display screen disposed on a display substrate, the display screen comprising a plurality of display pixels; a plurality of capacitive sensing electrodes for capacitive sensing in a sensing region of the display screen; a first touch and display driver integration (TDDI) circuit disposed on the display substrate, the first TDDI circuit comprising: a source driver circuit configured to drive at least a subset of the plurality of display pixels based on a processed image signal; and an analog frontend for the capacitive sensing, the analog frontend interfacing with the plurality of capacitive sensing electrodes to obtain a plurality of touch signals; an image processing circuit configured to generate the processed image signal based on a received image signal and a display parameter; a touch processing circuit configured to generate a touch output signal by processing the plurality of touch signals based on instructions of a touch firmware; and a memory disposed physically separate from the display substrate, the memory storing the display parameter and the touch firmware.

In general, in one aspect, one or more embodiments relate to an input-display device circuitry, comprising: a touch and display driver integration (TDDI) circuit disposed on a substrate, the TDDI circuit comprising: a source driver circuit configured to drive at least a subset of a plurality of display pixels of a display screen based on a processed image signal; and an analog frontend for a capacitive sensing, the analog frontend interfacing with a plurality of capacitive sensing electrodes for capacitive sensing in a sensing region of the display screen, to obtain a plurality of touch signals; an image processing circuit configured to generate the processed image signal based on a received image signal and a display parameter; a touch processing circuit configured to generate a touch output signal by processing the plurality of touch signals based on instructions of a touch firmware; and a memory disposed physically separate from the substrate, the memory storing the display parameter and the touch firmware.

In general, in one aspect, one or more embodiments relate to a method of operating an input-display device, comprising: obtaining a display parameter by an image processing circuit from a memory; obtaining a touch firmware by a touch processing circuit from the memory; generating, by the image processing circuit, a processed image signal based on a received image signal and the display parameter; driving, by a source driver circuit, a plurality of display pixels of a display screen based on the processed image signal; obtaining, by an analog frontend for capacitive sensing, touch signals from a plurality of capacitive sensing electrodes for capacitive sensing in a sensing region of the display screen; and generating, by the touch processing circuit, a touch output signal, by processing the touch signals based on instructions of the touch firmware, wherein the source driver circuit and the analog frontend are integrated in a touch and display driver (TDDI) circuit disposed on a display substrate associated with the display screen, and wherein the memory is disposed physically separate from the display substrate.

Other aspects of the embodiments will be apparent from the following description and the appended claims.

DETAILED DESCRIPTION

Figure 1:
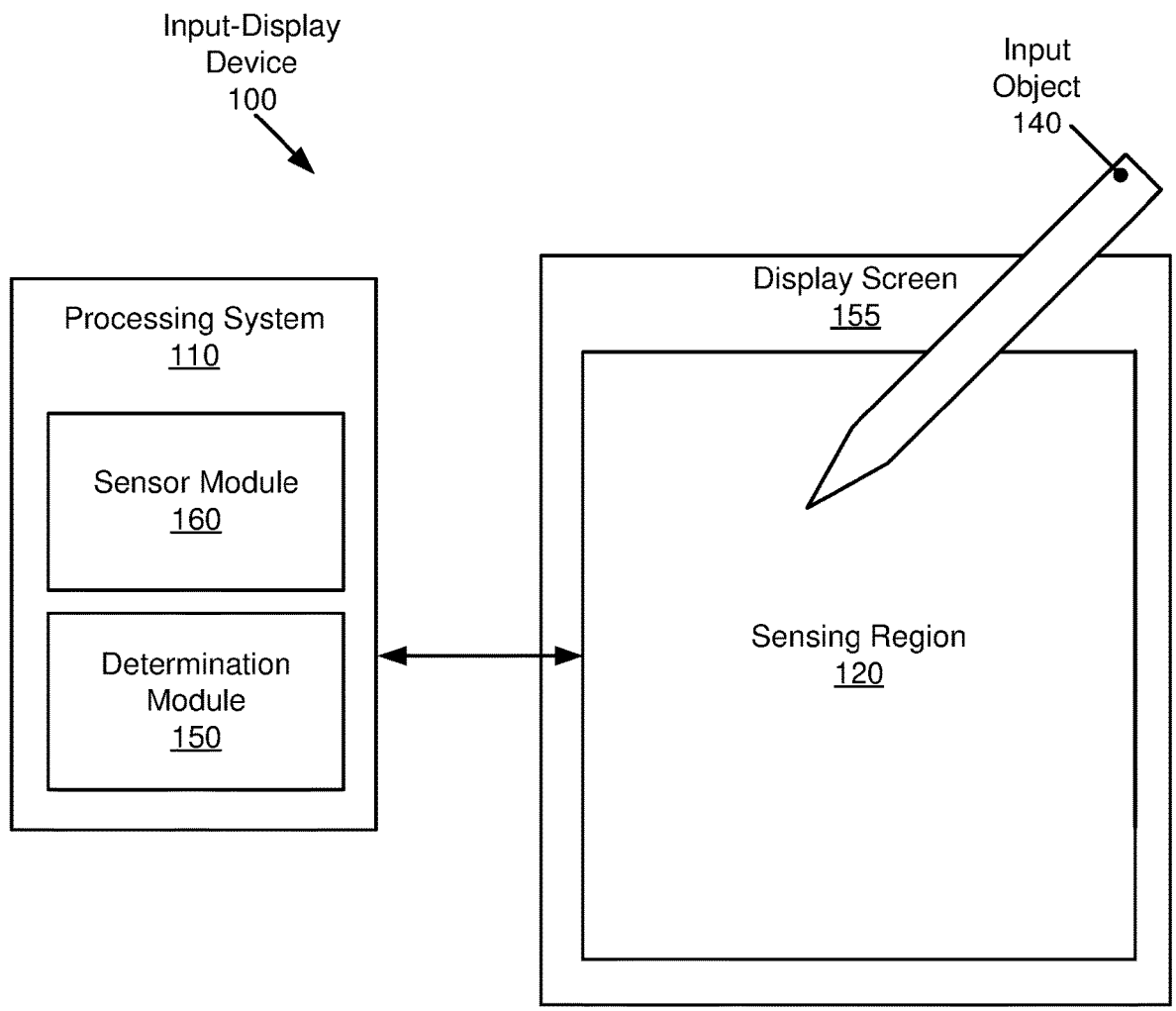
FIG. 1 shows a block diagram of an input-display device, in accordance with one or more embodiments.

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input-display devices and methods that use a shared memory. An input-display device may include a display device, a proximity sensor device, and/or a force sensor device, e.g., in the form of a touch display.

The display device may use a memory to store display parameters. Display parameters may serve various purposes such as, for example, the correction of inhomogeneities in the display. Consider, for example, an organic light emitting diode (OLED) display panel or a liquid crystal display (LCD) panel. A production process of a display panel such as an OLED display panel and an LCD panel may cause variations in the pixel characteristics. The variations in the pixel characteristics may cause mura, i.e., a luminance non-uniformity, in a displayed image. Performing mura correction, for example, in a display panel or a driver of the display device may effectively improve the image quality of a displayed image. Mura correction data may be determined in a test or calibration process of the display module and may be written into a memory. Before starting a display operation to display an image on the display panel, for example, at boot-up of a display driver, the mura correction data may be obtained from the memory. An error detection and/or correction may be performed on the mura correction data. Subsequently, the mura correction may be performed using the mura correction data in the memory, as further described below. Many aspects of mura correction are more fully described in U.S. Patent Application Publication No. 2020/0111430 (U.S. patent application Ser. No. 16/581, 006), the full disclosure of which is incorporated herein by reference.

The input device may use a memory to store a firmware. The firmware may include instructions for operations performing a touch or force sensing, by the input device, as described below. The operations may be performed on a microcontroller executing the firmware.

One or more embodiments have a single memory that stores both the firmware of the input device and the display parameters of the display device. The sharing of a single memory for the firmware and the display parameters may reduce the number of integrated circuits (ICs) that are required in an input-display device. The sharing of a single memory may, thus, simplify manufacturing, reduce spatial requirements (by avoiding the addition of ICs) and/or reduce cost.

FIG. 1 is a block diagram of an example of an input-display device (100), in accordance with one or more embodiments. The input-display device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), automotive infotainment devices, gaming devices, etc.

In FIG. 1, the input-display device (100) includes a proximity and/or force sensor device (e.g., "touchpad" or a "touch sensor device") configured to sense input provided by one or more input objects (140) in a sensing region (120). Example input objects include styli, an active pen, and fingers.

The sensing region (120) encompasses any space above, around, in and/or near the input-display device (100) in which the input device (100) is able to detect user input (e.g., user input provided by one or more input objects). The sizes, shapes, and locations of particular sensing regions may vary widely from embodiment to embodiment.

The input-display device (100) may utilize any combination of sensor components and sensing technologies to detect user input in the sensing region (120). The input-display device (100) includes one or more sensing elements for detecting user input. As a non-limiting example, the input-display device (100) may use capacitive techniques.

In some capacitive implementations of the input-display device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated relative to a reference voltage (e.g. system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal to noise ratio, determine positional information of an input object, identify a gesture, determine an action to perform based on the gesture, a combination of gestures or other information, and/or perform other operations.

In FIG. 1, a processing system (110) is shown as part of the input-display device (100). The processing system (110) is configured to operate the hardware of the input-display device (100) to detect input in the sensing region (120). The processing system (110) includes parts of or all of one or more integrated circuits (ICs) and/or other circuitry components. For example, a processing system may include circuitry for mutual and/or absolute capacitance sensing. In some embodiments, the processing system (110) also includes electronically-readable instructions, such as firmware code, software code, and/or the like. In some embodiments, components composing the processing system (110) are located together, such as near sensing element(s) of the input-display device (100). In other embodiments, components of processing system (110) are physically separate with one or more components close to the sensing element(s) of the input-display device (100), and one or more components elsewhere. For example, the input-display device (100) may be a peripheral coupled to a computing device, and the processing system (110) may include software configured to run on a central processing unit of the computing device and one or more ICs (perhaps with associated firmware) separate from the central processing unit. As another example, the input-display device (100) may be physically integrated in a mobile device, and the processing system (110) may include circuits and firmware that are part of a main processor of the mobile device. In some embodiments, the processing system (110) is dedicated to implementing the input-display device (100). In other embodiments, the processing system (110) also performs other functions, such as driving haptic actuators, etc.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input-display device (100) is implemented with additional input components that are operated by the processing system (110) or by some other processing system. These additional input components may provide redundant functionality for input in the sensing region (120), or some other functionality.

In some embodiments, the input-display device (100) includes a touch screen interface, and the sensing region (120) overlaps at least part of an active area of a display screen (155). For example, the input-display device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The proximity and/or force sensor device and the display screen of the input-display device (100) may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
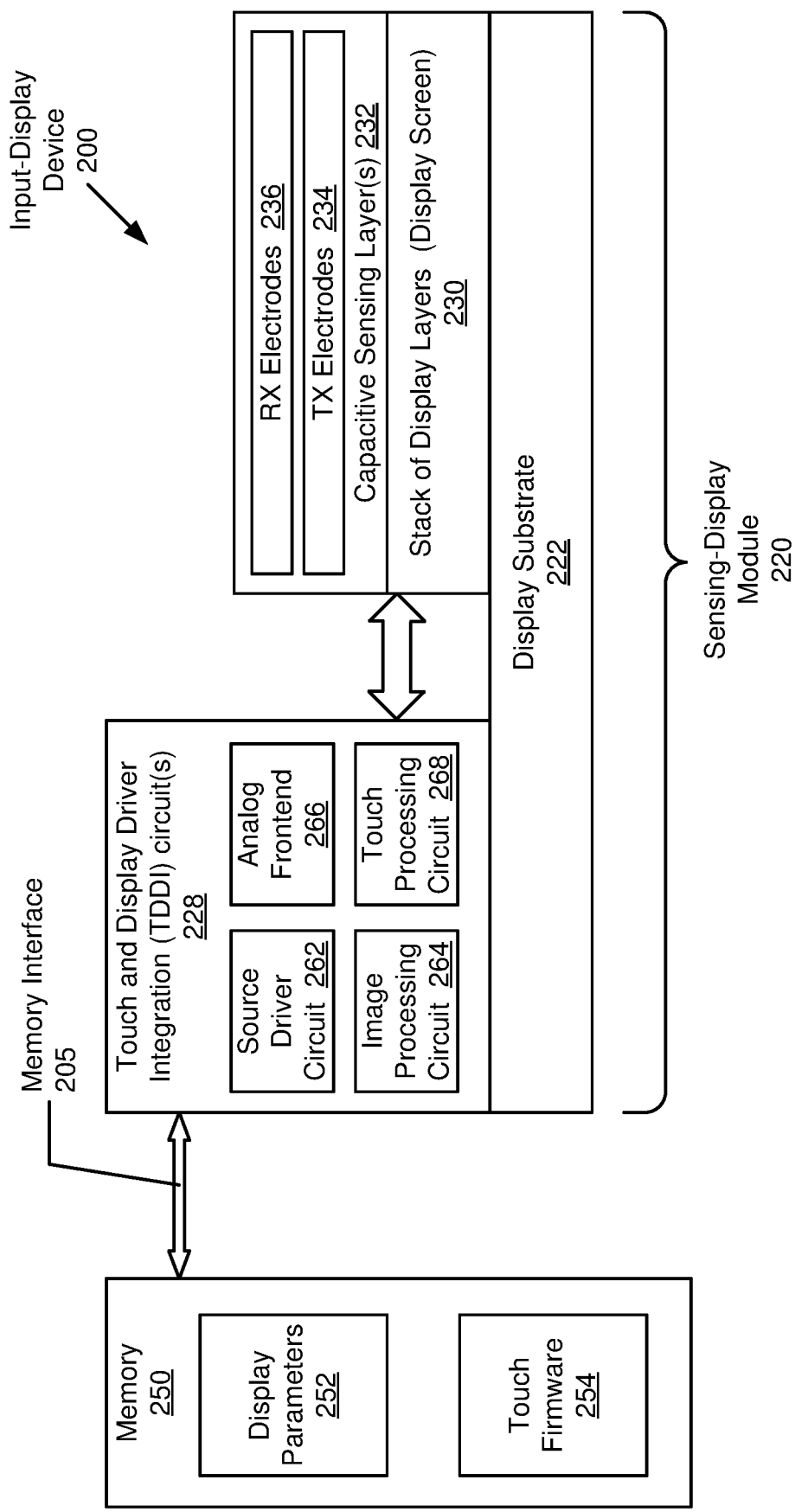
FIG. 2 shows a block diagram of an input-display device in accordance with one or more embodiments.

FIG. 2 shows an input-display device (200) in accordance with one or more embodiments. As shown in FIG. 2, the input-display device (200) includes a sensing-display module (220) and a memory (250) coupled to the sensing-display module via a memory interface (205). The sensing-display module (220) may implement all or a part of the sensing region (120) and all or a part of the display screen (155), discussed above in reference to FIG. 1.

In one or more embodiments, the sensing-display module (220) includes multiple layers including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222).

The stack of display layers (230) may include LCD display layers such as a color filter glass layer, a liquid crystal layer, and a TFT layer disposed on the display substrate (222), which may be glass.

The sensing-display module (220) may have additional layers and components. In one or more embodiments, multiple transmitter (TX) (234) and/or receiver (RX) (236) electrodes are disposed in the one or more capacitive sensing layers (232) in a sensing region of the display screen. The sensing region may span all or part of the display screen. The TX (234) and/or RX (236) electrodes may be used in capacitance sensing (e.g., absolute capacitance sensing, mutual capacitance sensing, etc.). While in FIG. 2, the capacitive sensing layer(s) (232) are shown as being disposed on top of the stack of display layers (230), those skilled in the art will appreciate that these layers may be located anywhere, relative to the stack of display layers (230). For example, one layer with RX electrodes (236) may be located on top of the stack of display layers (230), and another layer with TX electrodes (234) may be located in or below the stack of display layers (230). Alternatively, there may be no layer with TX electrodes. In one or more embodiments, the sensing module (220) includes a matrix pad sensor with numerous sensing pads and traces connecting to the sensing pads in a metal mesh layer across the sensing region. The matrix pad sensor may include at least one such metal mesh layer. Instead of using a dedicated metal mesh layer, a display layer, e.g., a OLED display cathode layer may be patterned to serve as a metal mesh layer.

In one or more embodiments, the TX electrodes (234) and the RX electrodes (236), together, implement mutual capacitance sensing. In other words, a waveform is driven onto the TX electrodes (234) and a resulting signal(s) is received from the RX electrodes (236). The resulting signal is a function of the waveform and change in capacitance between the TX electrodes and RX electrodes (234, 236) due to the presence of an input object.

In one or more embodiments, the RX electrodes (236) are operated to perform absolute capacitance sensing independent of the TX electrodes (234). In one or more embodiments, the transmitter electrodes (234) are operated to perform absolute capacitance sensing independent of the receiver electrodes (236).

In one or more embodiments, the stack of display layers (230) includes one or more layers, e.g., a thin-film transistor (TFT) layer, with source lines and gate lines and transistors for controlling the individual OLED, LCD or microLED units of the pixels of the display screen. In one or more embodiments, one or more source lines and/or one or more gate lines are also operated to perform absolute capacitance sensing.

In one or more embodiments, a touch and display driver integration (TDDI) circuit (228) includes a source driver circuit (262) that drives the transistors controlling the pixels of the display screen. Each of the pixels may include an OLED pixel, a microLED pixel, an LCD pixel, etc. The TDDI circuit (228) may receive an image signal from a host application processor (e.g. a video processor), or any other component (not shown) that provides image content to be displayed on the display screen (155). The received image signal may be in digital form. An image processing circuit (264) of the TDDI circuit (228) may process the received image signal to obtain a processed image signal. The processed image signal may be provided to the source driver circuit (262) where an analog signal may be generated to drive the transistors associated with the pixels of the display screen. Any kind of additional circuits related to the displaying of images may be included in the TDDI circuit (228), without departing from the disclosure. In one or more embodiments, the image processing circuit (264) of the TDDI circuit (228) performs a mura correction and/or a deburn correction.

The mura correction may address variations in the pixel characteristics of, for example, the OLED screen. Performing the mura correction may effectively improve the image quality of a displayed image, for example, an unevenness in color and/or luminance. Mura correction data may be determined in a test or calibration process of the OLED screen, involving electrical and/or optical measurements, and may be written into the memory (250) as display parameters (252), for example, structured as a lookup table. Error check codes may be included. To perform the mura correction, the display parameters (252) may be read from the memory (250). Based on the mura correction data in the display parameters, the image processing circuit (264) of the TDDI circuit (228) may perform an image processing of image data received from elsewhere (e.g., from a main processor). Subsequently, the source driver circuit (262) of the TDDI circuit (228) may drive the individual pixels of the OLED screen based on the image data obtained through the image processing, thereby performing the mura correction.

The deburn correction and other corrections may be performed in a similar manner, using deburn correction data or other correction data stored as display parameters (252) in the memory (250).

In one or more embodiments, the TDDI circuit (228) is further configured to perform capacitance sensing. The TDDI circuit (228) may drive electrodes (e.g., the TX electrodes (234) or a subset of the TX electrodes (234)), and may receive resulting signals from electrodes (e.g., from the RX electrodes (236) or a subset of the RX electrodes (236)), to determine the presence and/or position of an input object (e.g., input object (140), discussed above in reference to FIG. 1). The TDDI circuit (228) may include various components. In one embodiment, the TDDI circuit (228) includes an analog frontend (266) configured to perform the capacitance sensing by driving the electrodes, receiving the resulting signals, and analog-to-digital converting the resulting signals. The digital processing may be performed elsewhere, by a touch processing circuit (268), e.g., a microprocessor, digital signal processor, etc. In one embodiment, the TDDI circuit (228) includes some or all elements of the touch processing circuit (268). The touch firmware (254) may provide the instructions for the digital processing by the touch processing circuit (268). The touch firmware (254) may be stored in the memory (250) as an array of binary data. In one or more embodiments, the same memory (i.e. memory (250)), thus, stores the display parameters (252) and the touch firmware (254). Therefore, no additional, separate memory is necessary to accommodate the touch firmware (254).

An extensive discussion of various configurations is provided below with reference to FIGS. 3A, 3B, 4, 5, 6, and 7. Depending on the configuration, the circuit elements related to performing capacitive sensing may correspond to the sensor module (160) and the determination module (150) in FIG. 1.

In one or more embodiments, the TDDI circuit (228) is housed in a single semiconductor package, e.g., an application-specific integrated circuit (ASIC). The source driver circuit (262), the image processing circuit (264), the analog frontend (266), and/or the touch processing circuit (268) may be on separate dies or on a single die, in the semiconductor package. The semiconductor package (228), in one or more embodiments, is disposed on the display substrate (222).

While FIG. 2 shows the TDDI circuit (228) on the display substrate (222), the TDDI circuit may be located elsewhere, for example, on a flexible printed circuit different from the display substrate (222). Further, embodiments of the disclosure may include multiple TDDI circuits, each associated with a different region on the display of the sensing-display module (220).

In one or more embodiments, the memory (250) is non-volatile memory, for example, flash memory. Any other type of non-volatile memory may be used, without departing from the disclosure. Alternatively, the memory (250) may be volatile memory. If volatile memory is used, the display parameters (252) and the touch firmware (254) may be loaded into the volatile memory from elsewhere. The memory (250) may be located on a flexible printed circuit, on a mainboard, or elsewhere. In one or more embodiments, the memory (250) is physically separate from the TDDI circuit (228). Further, in one or more embodiments, the memory (250) is not disposed on the display substrate (222), e.g., because the available surface of the display substrate may be insufficient, or for other reasons. A memory interface (205) may interface the memory (250) with the TDDI circuit (228) on the display substrate (222). The memory interface may be any kind of memory interface, and may be specific to the memory. For example, for flash memory, a serial peripheral interface (SPI) may be used. Additional details are provided with reference to the subsequently discussed figures.

While the above discussion of FIG. 2 is mostly in context of OLED displays, those skilled in the art will appreciate that the described technology is applicable to other display technologies, without departing from the disclosure.

Figure 3B:
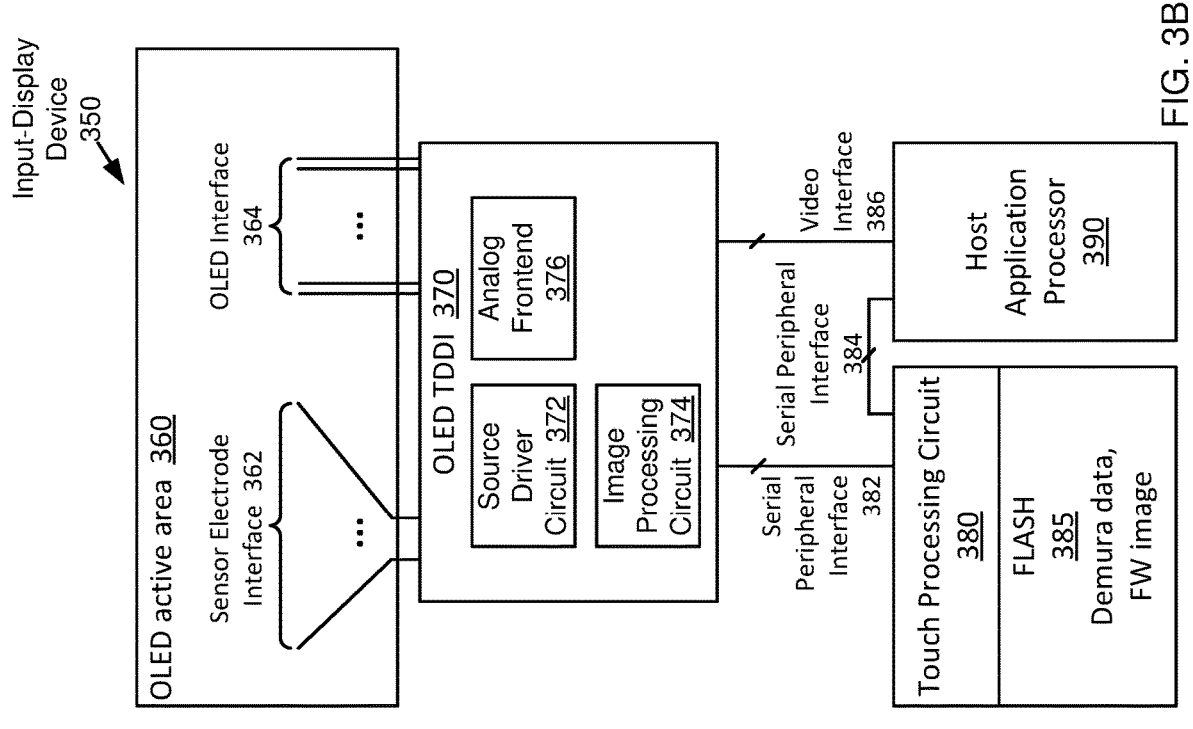
FIG. 3B shows a block diagram of an input-display device in accordance with one or more embodiments.
Figure 3A:
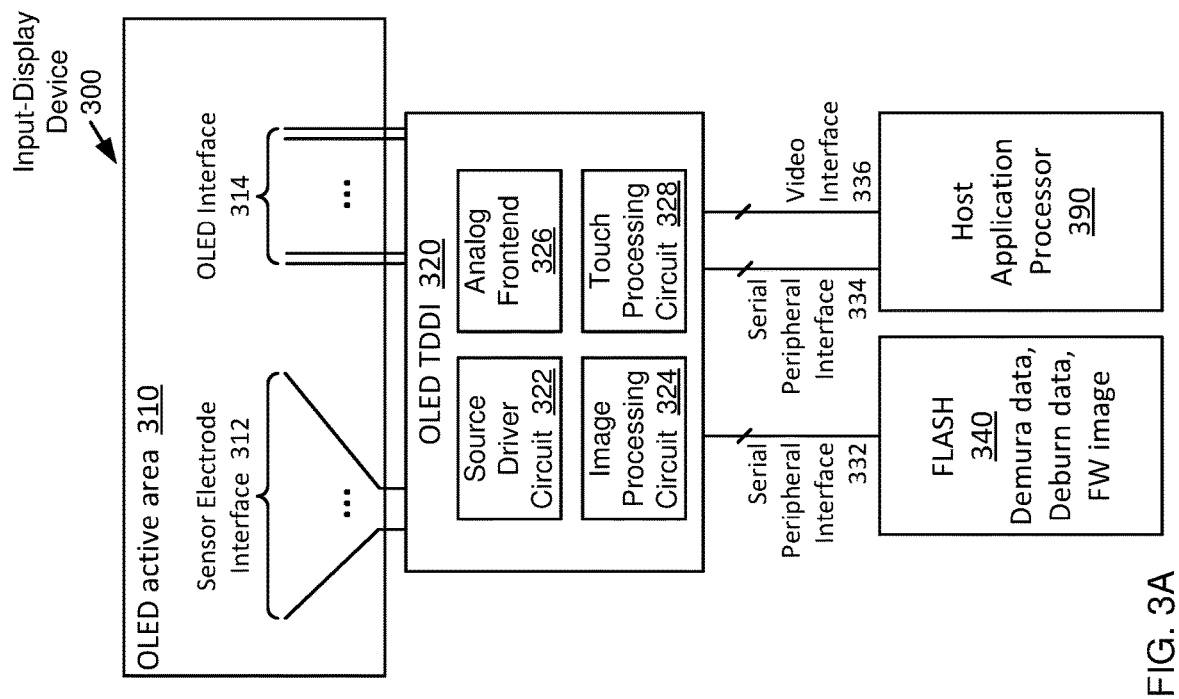
FIG. 3A shows a block diagram of an input-display device in accordance with one or more embodiments.

Turning to FIG. 3A, an input-display device (300), in accordance with one or more embodiments, is shown. The input-display device (300) includes an OLED active area (310), which may be similar to the configuration described with reference to FIG. 2. Specifically, the OLED active area (310) may be the sensing region of the input display device (200), where the capacitive sensing layer(s) (232) enables capacitive sensing over the stack of display layers forming the display screen (230). In other words, the active area (310), may be formed by, for example, a touch screen. The input-display device further includes an OLED TDDI circuit (320), also as previously described. The OLED TDDI circuit (320) may be located on a display substrate, together with the OLED display screen providing the OLED active area (310). A sensor electrode interface (312) may provide electrical connections to the capacitive sensor electrodes (not shown). An OLED interface (314) may provide electrical connections to the OLED display screen, e.g., to transistors in a TFT layer.

In one or more embodiments, the OLED TDDI circuit (320) includes a source driver circuit (322), an image processing circuit (324), an analog frontend (326), and a touch processing circuit (328), as previously described.

The touch processing circuit (328), in one or more embodiments, is configured to process the touch signals obtained by the analog front end (326) to produce a touch output signal, based on instructions of a touch firmware. The operations being performed when executing the instructions may include operation to perform, for example, touch sensing or force sensing, as initially described with reference to FIG. 1. Accordingly, the touch output signal may include a touch location or multiple touch locations, a force, etc. The touch firmware may be obtained from a flash memory (340). The touch processing circuit (328) may download the touch firmware into volatile memory prior to executing the touch firmware. Alternatively, the touch processing circuit (328) may execute the touch firmware directly from the flash memory (340).

The image processing circuit (324), in one or more embodiments, is configured to process a received image signal, e.g., an image signal received from the host application processor (390). The processing by the image processing circuit (324) may involve demura operations, deburn operations, and other operations such as a white point correction. The demura and/or deburn operations may be performed based on demura and/or deburn data, which may be obtained from a flash memory (340).

The flash memory (340) may be located separately from the OLED TDDI circuit (320), for example, on a different flexible printed circuit, a mainboard, etc. A serial peripheral interface (SPI) (332) may be used to interface the flash memory (340) with the OLED TDDI circuit (320). For increased bandwidth, the SPI may be a quad SPI operating at, for example, 42 MHz. An increased bandwidth may be particularly desirable when the touch processing circuit (328) executes the firmware directly from the flash memory (340) instead of using a local copy in volatile memory.

The host application processor (390) may be located separately from the OLED TDDI circuit (320) and may be part of an electronic system as initially described with reference to FIG. 1. For example, the host application processor may be a main processor and may be located on a mainboard.

The host application processor (390), in one or more embodiments, provides the image signal to the image processing circuit (324) of the OLED TDDI circuit (320). A video interface (336) may connect the host application processor (390) to the OLED TDDI circuit (320) to provide the image signal. The video interface (336) may be a serial interface with a sufficient bandwidth. The video interface (336) may be, for example, a MIPI D-PHY interface with four lanes providing a 1.5 Gbps bandwidth.

The host application processor (390), in one or more embodiments, further receives the touch output signal from the touch processing circuit (328). A serial peripheral interface (SPI) (334) may connect the host application processor (390) to the OLED TDDI circuit (320) to receive the touch output signal from the touch processing circuit (328). The SPI (334) may operate at, for example 10 MHz, to accommodate a payload associated with the touch processing of, for example, 4.9 Mbps. Any other interface that provides sufficient bandwidth may be used without departing from the disclosure.

With the host application processor (390) receiving the touch output signal from the touch processing circuit (328), and providing the image signal to the image processing circuit (324), the host application processor may execute a software application operated by a user. User input, resulting in a touch output signal may cause the software application to update the image signal.

The input-display device (300) may be distinguished from other input-display devices, discussed below, based on the presence of a single OLED TDDI circuit (320) including a source driver circuit (322), an image processing circuit (324), an analog frontend (326), and a touch processing circuit (328).

Turning to FIG. 3B, an input-display device (350), in accordance with one or more embodiments, is shown. Some aspects of the input-display device (350) are similar to the input-display device (300) in FIG. 3A. Specifically, the input-display device (350) includes an OLED active area (360), an OLED TDDI circuit (370), a sensor electrode interface (362), an OLED interface (364), and a host application processor (390).

Other aspects distinguish the input-display device (350) from the input-display device (300). In the input-display device (350), the touch processing circuit (380) is separate from the OLED TDDI circuit (370). Specifically, the touch processing circuit (380) is co-located with the flash memory (385). The touch processing circuit (380) may form an integrated circuit with the flash memory (385). Accordingly, touch signals obtained by the analog frontend (376) may be transmitted, via the SPI (382) to the touch processing circuit (380), where the touch output signal is obtained. To accommodate the payload associated with the transmission of the touch signals, the SPI (382) may be a quad SPI operating at, for example, 54 MHz to accommodate a payload of 9.78 Mbps.

The SPI (384) may be used to transmit the touch output signal from the touch processing circuit (380) to the host application processor (390). To accommodate the payload associated with the transmission of the touch output signal, the SPI (384) may be operate at, for example, 15 MHz to accommodate a payload of 9.8 Mbps.

The source driver circuit (372), the image processing circuit (374), and the analog frontend (376) may be similar to the corresponding components in FIG. 3A.

The input-display device (350) may be distinguished from other input-display devices as discussed, based on the presence of a single OLED TDDI circuit (370) including a source driver circuit (372), an image processing circuit (374), and an analog frontend (376), while the touch processing circuit (380) is co-located with the flash memory (385). Accordingly, in the input-display device (350), the digital touch processing occurs external to the OLED TDDI circuit (370), whereas in the input-display device (300), the digital touch processing occurs internal to the OLED TDDI circuit (320).

Figure 4:
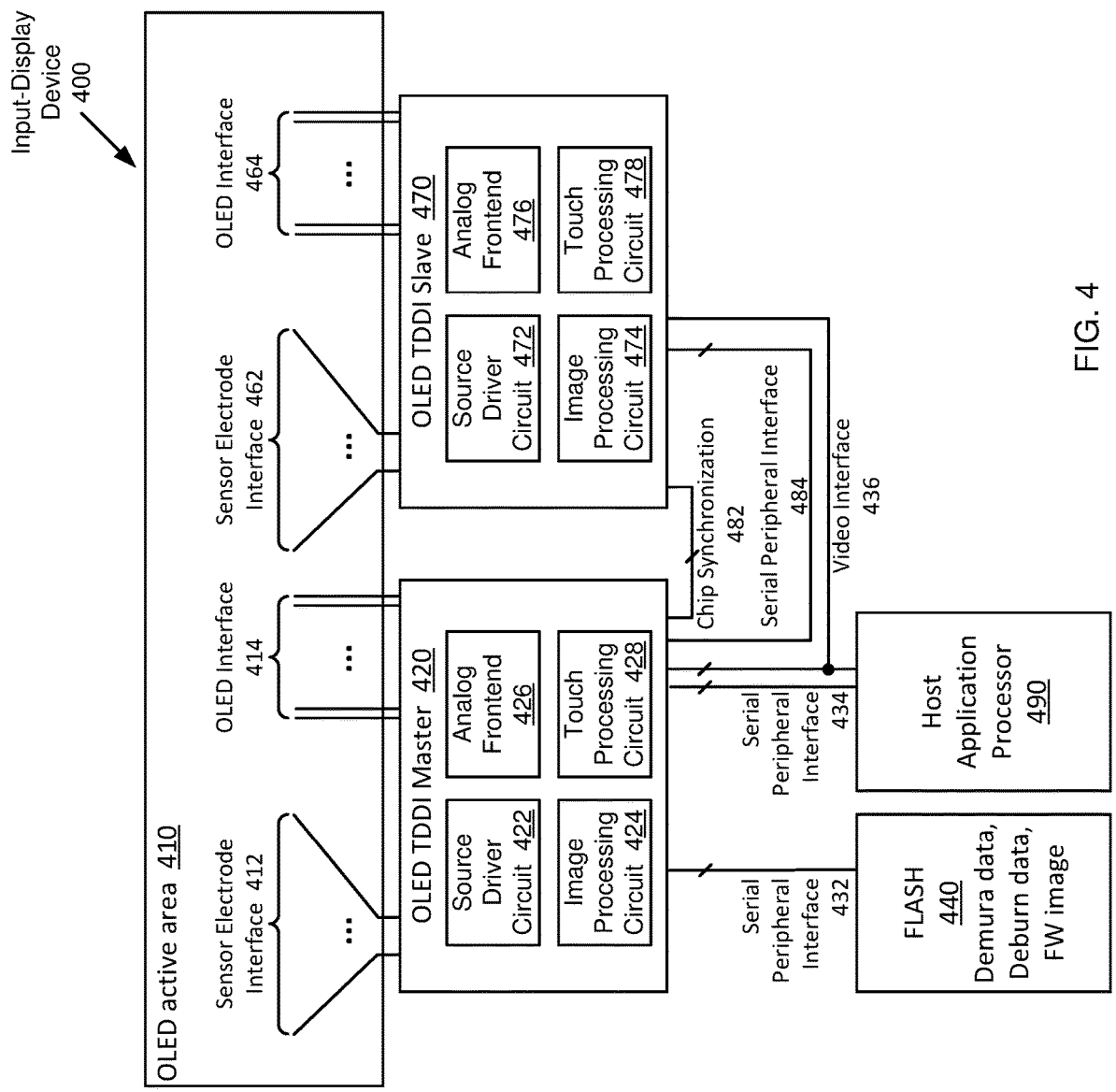
FIG. 4 shows a block diagram of an input-display device in accordance with one or more embodiments.

Turning to FIG. 4, an input-display device (400), in accordance with one or more embodiments, is shown. While the input-display device (400), like the input-display device (300), includes an OLED active area (410), two OLED TDDI circuits (an OLED TDDI master (420), and an OLED TDDI slave (470)) are used in conjunction with the OLED active area (410). Two OLED TDDI circuits may be used, for example, for larger OLED active areas with more pixels, more touch sensor electrodes, etc. The OLED active area (410) may be split into sections that are service by different OLED TDDI circuits. For example, a left or upper half of the OLED active area (410) may be interfaced with the OLED TDDI master (420) via the sensor electrode interface (412) and the OLED interface (414), and a right or lower half of the OLED active area (410) may be interfaced with the OLED TDDI slave (470) via the sensor electrode interface (462) and the OLED interface (464). Accordingly, the source driver circuits (422, 472), the image processing circuits (424, 474), the analog frontends (426, 476), and the touch processing circuits (428, 478) may be associated with only a section of the OLED active area, instead of the entire OLED active area. Otherwise, source driver circuits (422, 472), the image processing circuits (424, 474), the analog frontends (426, 476), and the touch processing circuits (428, 478) may operate in a manner similar to the corresponding elements of the input-display device (300).

In one or more embodiments, only the OLED TDDI master (420), but not the OLED TDDI slave (470) directly interfaces with the flash memory (440). A serial peripheral interface (SPI) (432) may be used to interface the flash memory (440) with the OLED TDDI master (420). For increased bandwidth, the SPI may be a quad SPI operating at, for example, 54 MHz, providing sufficient bandwidth to serve the OLED TDDI master (420) and the OLED TDDI slave (470). In the input-display device (400), the SPI (432) may be used to download demura data, deburn data, and/or the touch firmware for the OLED TDDI master (420) and for the OLED TDDI slave (470). Once the demura data, deburn data, and/or touch firmware are downloaded to the OLED TDDI master (420), the OLED TDDI master (420) may share the demura data, deburn data, and/or touch firmware with the OLED TDDI slave (470) via the SPI (484). For increased bandwidth, the SPI (484) may be a quad SPI operating at, for example, 27 MHz, providing sufficient bandwidth to serve the OLED TDDI slave (470). In particular, the bandwidth of the SPI (484) may be sufficient to accommodate the payload associated with the transmission of the touch output signal, e.g., 4.89 Mbps from the OLED TDDI slave (470) to the OLED TDDI master (420).

Another SPI (434) may interface the OLED TDDI master (420) with the host application processor (490) to return the touch output signal of the OLED TDDI master (420) and the touch output signal of the OLED TDDI slave (470), which is forwarded by the OLED TDDI master (420). For increased bandwidth, the SPI (434) may be a quad SPI operating at, for example, 15 MHz, providing sufficient bandwidth to accommodate a payload that includes the touch output signal at, for example, 9.8 Mbps.

In one or more embodiments, a chip synchronization interface (482) between the OLED TDDI master (420) and the OLED TDDI slave (470), enables synchronization of display and touch operations between the OLED TDDI master (420) and the OLED TDDI slave (470). The synchronization performed via the chip synchronization interface (482) may include a clock synchronization, and may further involve other aspects. For example, RGB data for parts of an image outside of the region of the physical screen updated by the OLED TDDI master (420) and the OLED TDDI slave (470) may be exchanged. The chip synchronization interface (482) may, thus, enable a synchronization of the image processing performed by the OLED TDDI master (420) and the OLED TDDI slave (470). Further, the chip synchronization interface (482) may enable a synchronization of the touch processing performed by the OLED TDDI master (420) and the OLED TDDI slave (470), e.g., by coordinating the updating of registers used for exchanging touch data.

A video interface (436) may connect the host application processor (390) to the OLED TDDI master (420) and to the OLED TDDI slave (470) to provide the image signal. The video interface (436) may be a serial interface with a sufficient bandwidth. The video interface (436) may be, for example, a MIPI D-PHY interface with four lanes providing a 1.5 Gbps bandwidth.

Broadly speaking, the input-display device (400) may, thus, be distinguished from the input-display device (300), based on the presence of an OLED TDDI master (420) and an OLED TDDI slave (470). In the input-display device (400), the data exchange of the OLED TDDI slave (470) is limited to data exchanges via the OLED TDDI master (420), with the exception of image signals which may be directly provided by the host application processor (490) to both the OLED TDDI master (420) and the OLED TDDI slave (470).

Figure 5:
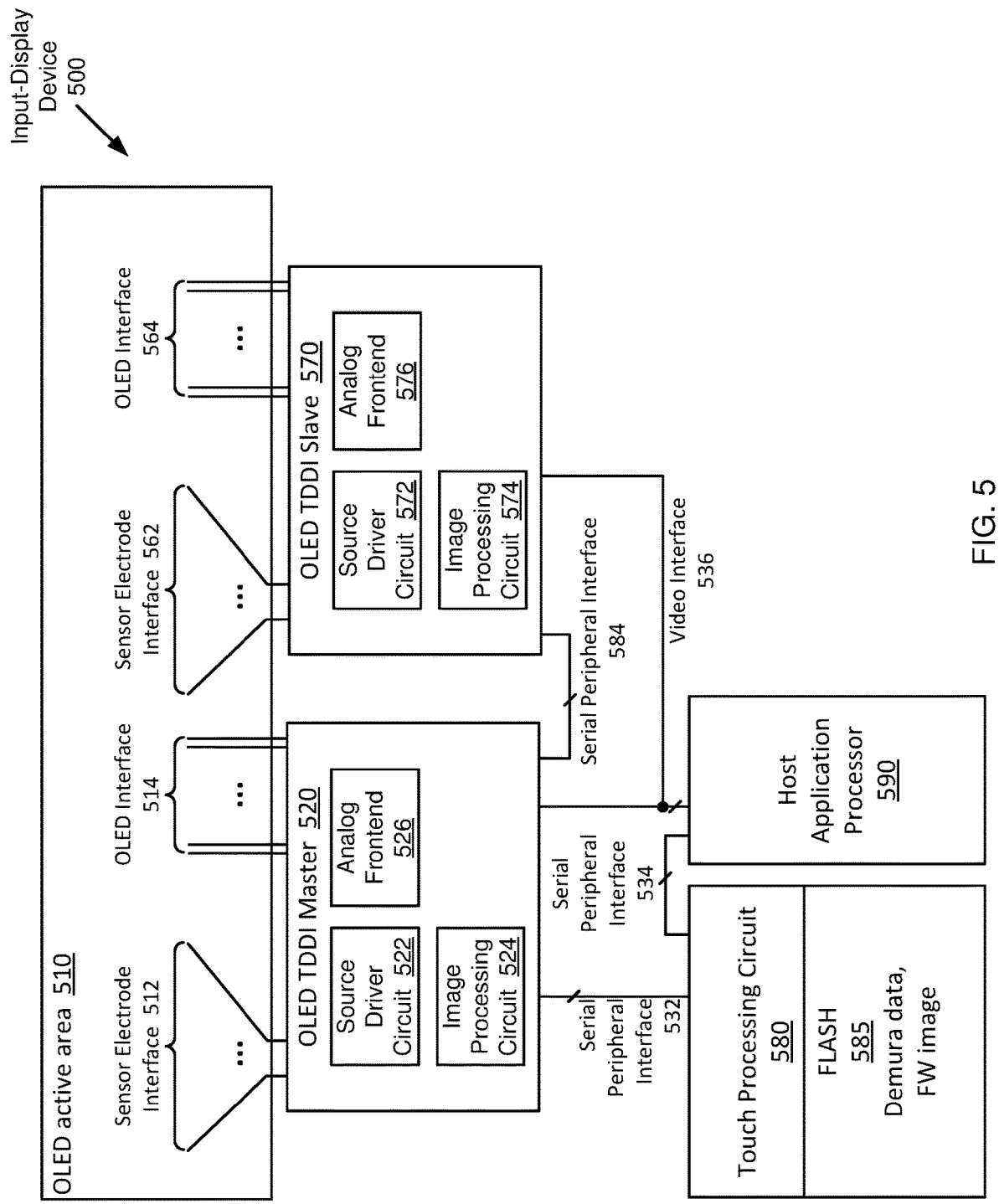
FIG. 5 shows a block diagram of an input-display device in accordance with one or more embodiments.

Turning to FIG. 5, an input-display device (500), in accordance with one or more embodiments, is shown. Aside from the subsequently discussed differences, the input-display device (500) may be substantially similar to the input-display device (400), shown in FIG. 4.

In the input-display device (500), the touch processing circuit (580) is separate from the OLED TDDI circuits (520, 570). Specifically, the touch processing circuit (580) is co-located with the flash memory (585). The touch processing circuit (580) may form an integrated circuit with the flash memory (585). Accordingly, touch signals obtained by the analog frontends (526, 576) may be transmitted, via the SPI (532) to the touch processing circuit (580), where the touch output signal may be obtained. The SPI (532) may be a quad SPI operating at, for example, 54 MHz to accommodate a payload of 9.78 Mbps, associated with the touch signals of the OLED TDDI master (520) and the OLED TDDI slave (570). The SPI (532) may also be used to share the display parameters (e.g., demura and/or deburn data) to the OLED TDDI master (520).

The SPI (584) may be used to transmit the touch signals from the OLED TDDI slave (570) to the OLED TDDI master (520). The SPI (584) may also be used for a synchronization between the OLED TDDI master (520) and the OLED TDDI slave (570). Similarly, the display parameters (e.g., demura and/or deburn data) may be shared from the OLED TDDI master (520) to the OLED TDDI slave (570) via the SPI (584). The SPI (584) may be a quad SPI operating at, for example, 27 MHz, to accommodate a payload of 4.9 Mbps, associated with the touch signals of the OLED TDDI slave (570).

An additional SPI (534) may be used to share the touch output signal, generated by the touch processing circuit (580) to the host application processor (590). To accommodate the payload associated with the transmission of the touch output signal, the SPI (534) may operate at, for example, 15 MHz to accommodate a payload of 9.8 Mbps.

Other components of the input-display device (500), such as, for example, the sensor electrode interfaces (512, 562), the OLED interface (514, 564), the source driver circuits (522, 572), the image processing circuits (524, 574), the analog frontends (526, 576), and the video interface (536) may be substantially similar to the corresponding components described with reference to FIG. 4.

The input-display device (500) may be distinguished from the input-display device (400), based on the touch processing circuit (580) being co-located with the flash memory (585). Accordingly, in the input-display device (500), the digital touch processing occurs external to the OLED TDDI master (520) and the OLED TDDI slave (570), whereas in the input-display device (400), the digital touch processing occurs internal to the OLED TDDI master (420) and the OLED TDDI slave (470).

Figure 6:
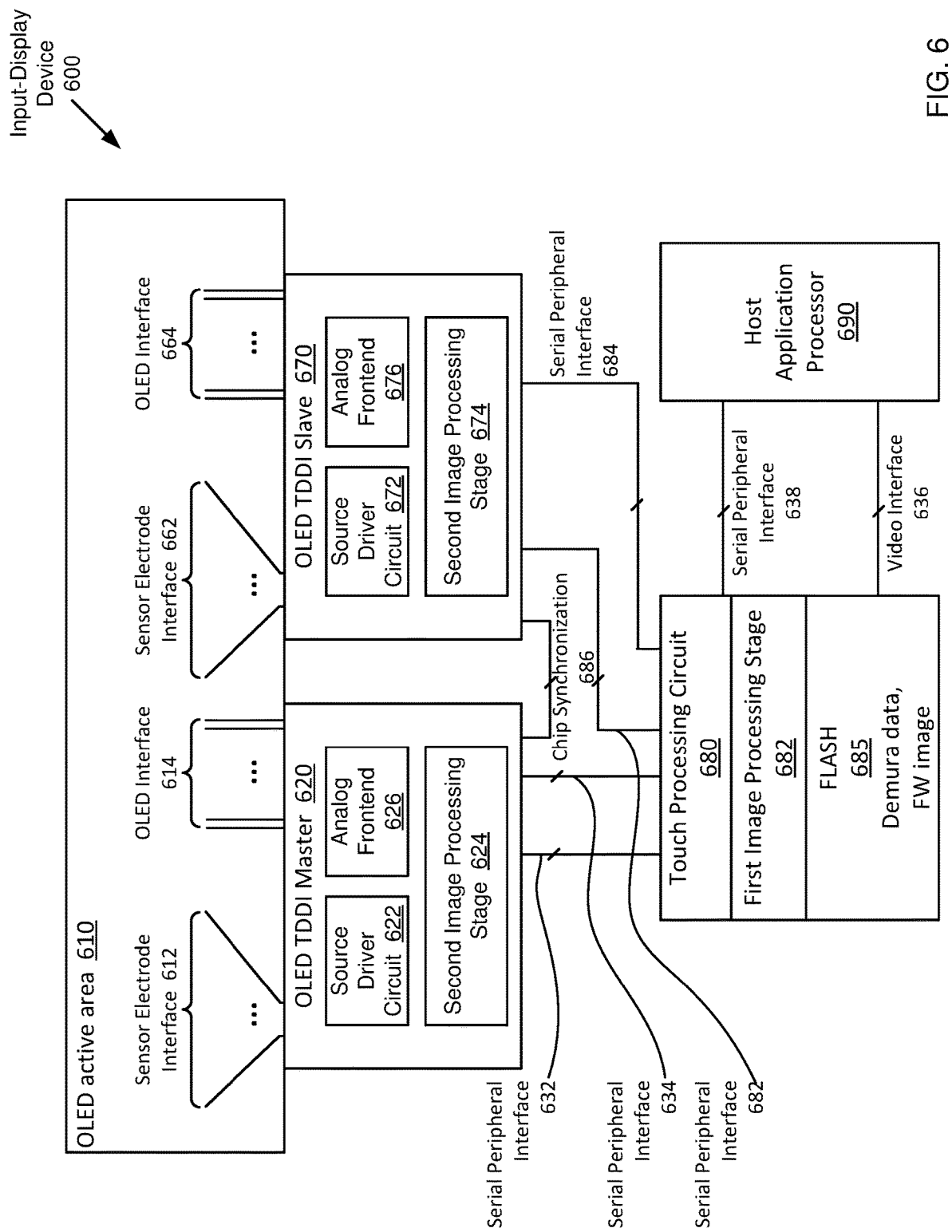
FIG. 6 shows a block diagram of an input-display device in accordance with one or more embodiments.

Turning to FIG. 6, an input-display device (600), in accordance with one or more embodiments, is shown. Aside from the subsequently discussed differences, the input-display device (600) is substantially similar to the input-display device (500), shown in FIG. 5.

In the input-display device (600), the image processing being performed on an image signal received from the host application processor (690) is split between a first image processing stage (682) co-located with the touch processing circuit (680) and the flash memory (685), and second image processing stages (624, 674), that are part of the OLED TDDI master (620) and the OLED TDDI slave (670), respectively. In combination, the first and the second image processing stages may perform as the previously discussed image processing circuit.

The first image processing stage (682) may perform types of image processing that do not require an accuracy or resolution that is specific to a pixel. For example, a white point correction may be performed. A compression of the resulting processed image may be performed, prior to sending the compressed processed image to the second image processing stages (624, 674). The compression may be a lossy compression and may reduce bandwidth requirements. In the input-display device (600), SPIs (634, 684) may be used to transmit the compressed processed image to the OLED TDDI master (620) and the OLED TDDI slave (670), respectively. SPIs (634, 684) may also be used to share the display parameters (e.g., demura and/or deburn data) with the OLED TDDI master (620) and the OLED TDDI slave (670), respectively.

The second image processing stages (624, 674) may subsequently perform additional image processing, including image processing that requires an accuracy or resolution that is specific to a pixel. Such a processing may include demura and deburn processing.

The input-display device (600) further includes SPIs (632, 682) between the touch processing circuit (680), and the OLED TDDI master (620) and the OLED TDDI slave (670), respectively. The SPIs (632, 682) may be used to transmit the touch signals obtained by the analog frontends (626, 676) to the touch processing circuit (680), where the touch output signal is obtained. The payload to be accommodated by each of the SPIs (632, 682) may be 4.89 Mbps. Unlike in the input-display device (500), the OLED TDDI slave (670) bypasses the OLED TDDI master (620) to send the touch signals directly to the touch processing circuit (680). Accordingly, no high bandwidth SPI is necessary to interface the OLED TDDI master (620) and the OLED TDDI slave (670). A chip synchronization interface (682) allows the OLED TDDI slave (670) to be synchronized to the OLED TDDI master (620).

Other components of the input-display device (600), such as, for example, the sensor electrode interfaces (612, 662), the OLED interfaces (614, 664), the source driver circuits (622, 672), the image processing circuits (624, 674), the analog frontends (626, 676), the touch processing circuit (680), the flash memory (685), the SPI (638), the video interface (636), and the host application processor (690) may be substantially similar to the corresponding components described with reference to FIG. 5.

The input-display device (600) may be distinguished from the input-display device (500), based on the image processing being split between a first image processing stage (682) and second image processing stages (624, 674).

Figure 7:
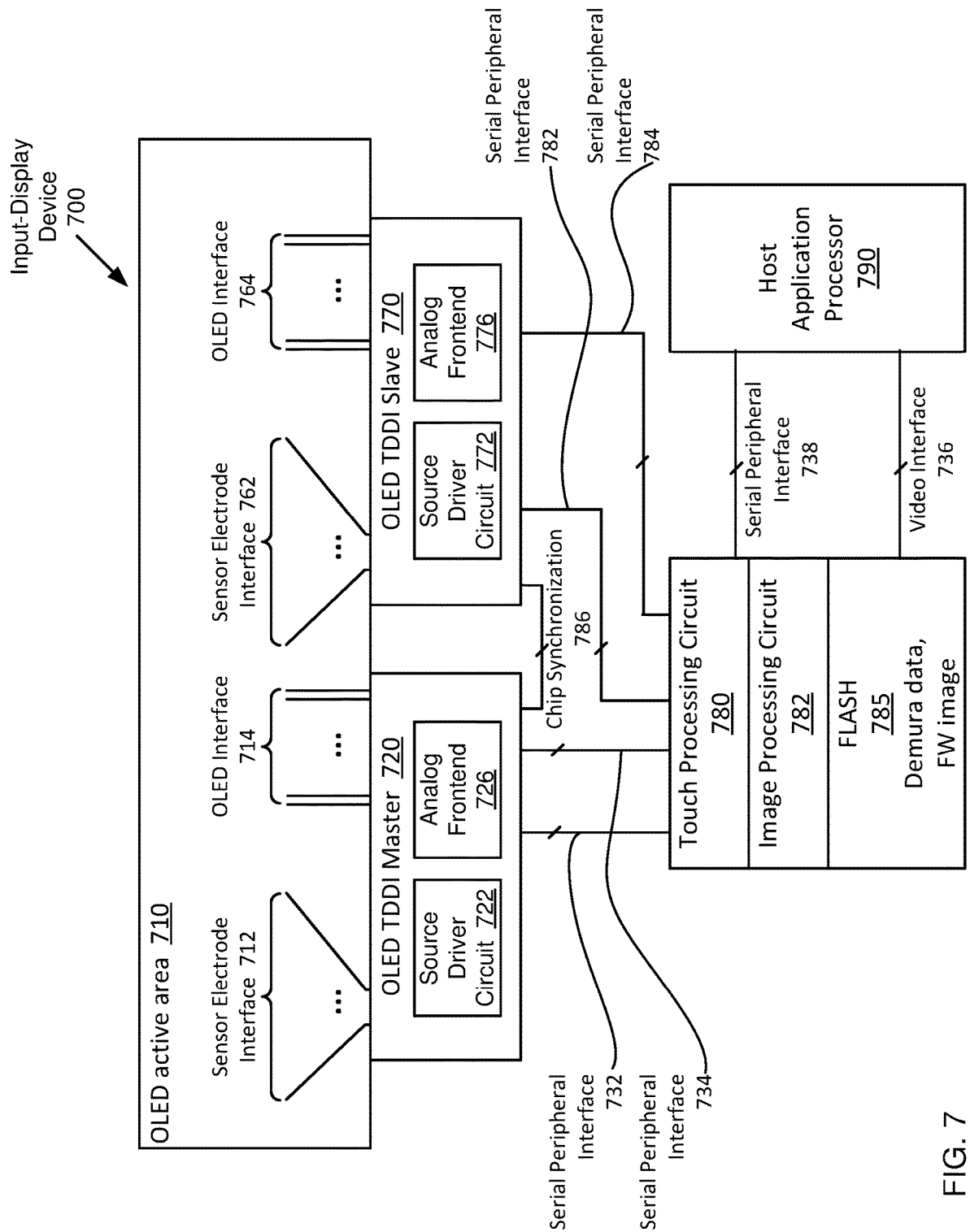
FIG. 7 shows a block diagram of an input-display device in accordance with one or more embodiments.

Turning to FIG. 7, an input-display device (700), in accordance with one or more embodiments, is shown. Aside from the subsequently discussed differences, the input-display device (700) is substantially similar to the input-display device (600), shown in FIG. 6.

In the input-display device (700), substantially all image processing operations, including demura and deburn operations are performed by the image processing circuit (782), which is co-located with the touch processing circuit (780) and the flash memory (785). The image processing operations may also include timing modifications, such as the introduction of a long horizontal blank period at the end of each row of pixels, e.g., to accommodate a capacitive sensing frame, during the long horizontal blank period. Any other timing modifications related to pixels, lines of pixels, and frames may be performed, without departing from the disclosure.

A resulting processed image may be sent to the OLED TDDI master (720) and the OLED TDDI slave (770), without compressing the resulting processed image. In the input-display device (700), SPIs (734, 784) may be used to transmit the processed image to the OLED TDDI master (720) and the OLED TDDI slave (670), respectively. The SPIs (734, 784) are configured to provide sufficient bandwidth for the processed image (without compression), e.g., 5.78 Gbps. No display parameters (e.g., demura and/or deburn data) may be shared with the OLED TDDI master (720) and the OLED TDDI slave (770), because the demura and deburn operations are performed by the image processing circuit (782).

Other components of the input-display device (700), such as, for example, the sensor electrode interfaces (712, 762), the OLED interface (714, 764), the source driver circuits (722, 772), the analog frontends (726, 776), the touch processing circuit (780), the flash memory (785), the SPIs (732, 782, 638), the clock synchronization interface (786), the video interface (736), and the host application processor (790) may be substantially similar to the corresponding components described with reference to FIG. 6.

The input-display device (700) may be distinguished from the input-display device (600), based on the image processing being entirely performed by the image processing circuit (782).

While various configurations have been described with reference to the figures, those skilled in the art will appreciate that other configurations are within the scope of the disclosure. Specifically, any of the configurations described with reference to FIGS. 3A, 3B, 4, 5, 6, and 7 may be combined with any other configuration as described, without departing from the disclosure.

Figure 8:
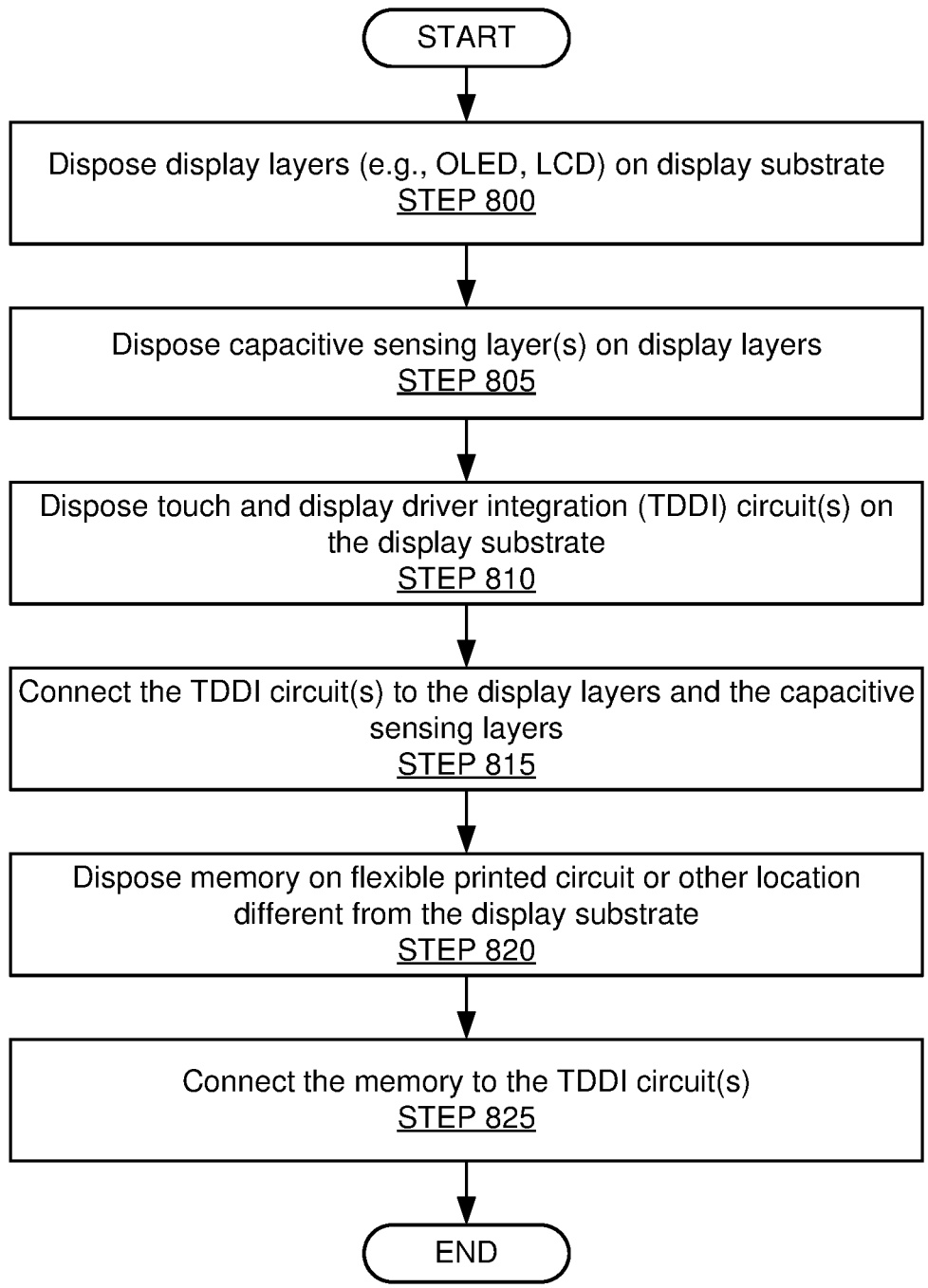
FIG. 8 shows a flowchart in accordance with one or more embodiments.
Figure 9:
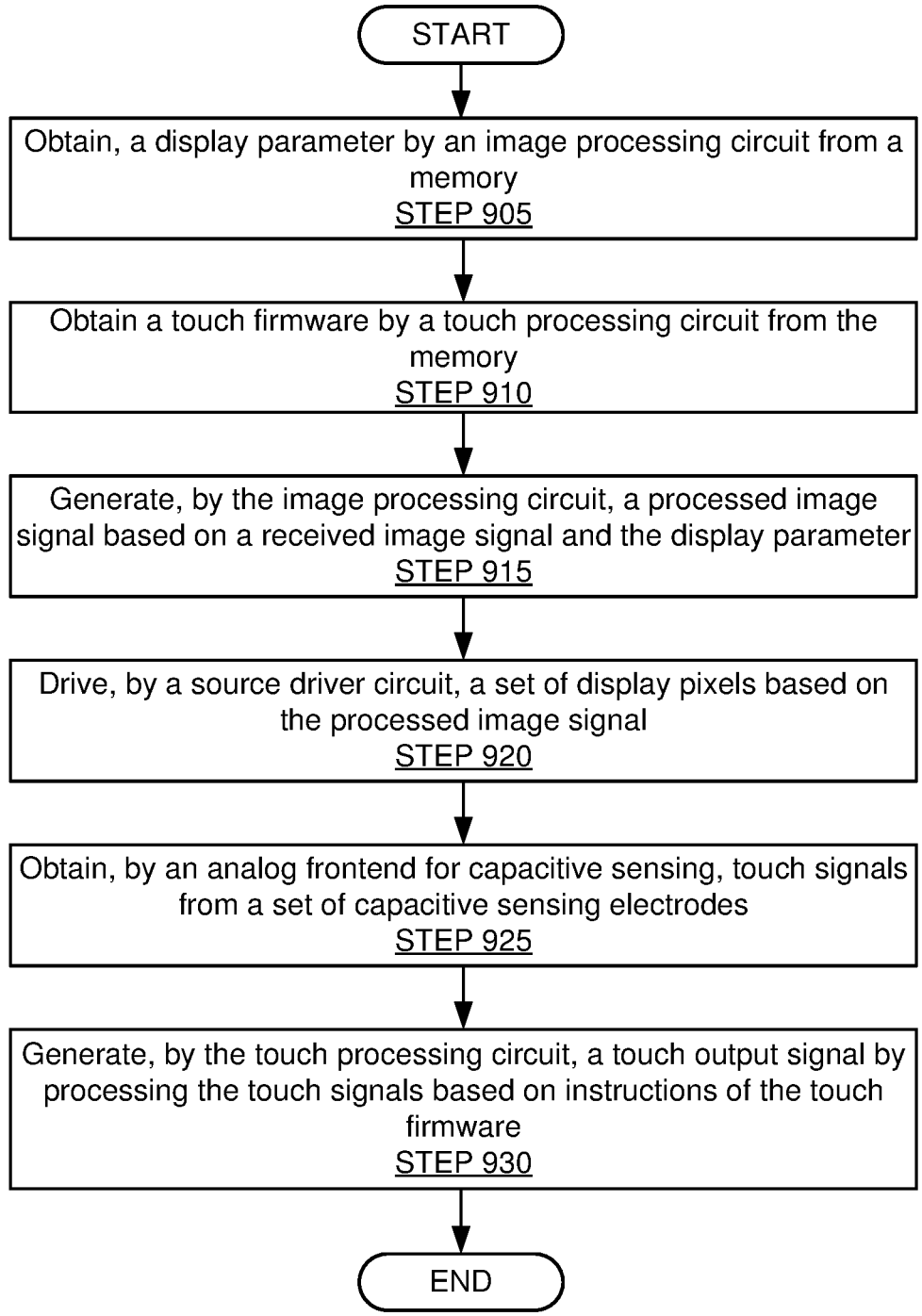
FIG. 9 shows a flowchart in accordance with one or more embodiments.

FIGS. 8 and 9 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIGS. 8 and 9.

The flowchart of FIG. 8 depicts a method of manufacturing an input-display. The result of executing the process of FIG. 8 may correspond to the input device depicted in any of FIGS. 2, 3A, 3B, 4, 5, 6, and 7.

In Step 800, display layers are disposed on the display substrate. Depending on the display type, the disposed display layers may differ.

In case of an OLED display screen, OLED layers are disposed on the display substrate to form a stack of display layers. The disposed layers may include an anode layer, an organic conductive layer, an organic emissive layer, and a cathode layer. The anode layer may include transistors, for an active OLED display screen. The display substrate may be flexible or rigid. Various materials, including but not limited to, plastic and glass may be used.

In case of an LCD display screen, LCD layers are disposed on the display substrate to form the stack of display layers. The disposed layers may include a TFT circuitry layer with transistors, a liquid crystal layer, and a color filter glass layer. The display substrate may be glass.

Other layers such as glass or film covers may be included, without departing from the disclosure.

In Step 805, one or more capacitive sensing layers are disposed on the stack of display layers. The capacitive sensing layers may include receiving (RX) and/or transmitting (TX) electrodes. One or more of the capacitive sensing layers may be in or on top of the stack of display layers.

In Step 810, one or more touch and display driver semiconductor package (TDDI) circuit(s) is/are disposed on the display substrate.

In STEP 815, the TDDI circuit(s) is/are coupled to the capacitive sensing electrodes. The TDDI circuit(s) may also be coupled to circuitry of the display layers, e.g., gate lines and/or source lines of an active OLED, or LCD screen.

In STEP 820, a memory is disposed on a flexible printed circuit, a mainboard, or another location different from the display substrate.

In STEP 825, the memory is coupled to the TDDI circuit(s) by a memory interface.

Turning to FIG. 9, a flowchart in accordance with one or more embodiments is shown. The flowchart of FIG. 9 depicts a method for operating an input-display device. One or more of the steps in FIG. 9 may be performed by the components of the input-display devices (200, 300, 350, 400, 500, 600, 700) discussed above in reference to FIGS. 2, 3A, 3B, 4, 5, 6, and 7. In one or more embodiments, one or more of the steps shown in FIG. 9 may be omitted, repeated, and/or performed in a different order than the order shown in FIG. 9. Accordingly, embodiments should not be considered limited to the specific arrangement of steps shown in FIG. 9.

In STEP 905, a display parameter is obtained by an image processing circuit. The display parameter may be obtained from a memory, e.g., a flash memory.

In STEP 910, a touch firmware is obtained by a touch processing circuit. The touch firmware may be obtained from a memory. In one or more embodiments, the memory storing the touch firmware is the same memory as the memory storing the display parameter.

In STEP 915, a processed image signal is generated based on a received image signal and the display parameter. STEP 915 may be performed by an image processing circuit.

In STEP 920, a set of display pixels are driven based on the processed image signal. STEP 920 may be performed by a source driver circuit.

In STEP 925, touch signals are obtained from a set of capacitive sensing electrodes. STEP 925 may be performed by an analog frontend.

In STEP 930, a touch output signal is generated by processing the touch signals based on instructions of the touch firmware. STEP 930 may be performed by the touch processing circuit.

Additional details regarding STEPS 905-930 are provided with regard to FIGS. 2, 3A, 3B, 4, 5, 6, and 7, where the corresponding components and possible variations of the steps are described.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input-display device, comprising:
   a display screen disposed on a display substrate, the display screen comprising a plurality of display pixels;
   a plurality of capacitive sensing electrodes for capacitive sensing in a sensing region of the display screen;
   a first touch and display driver integration (TDDI) circuit disposed on the display substrate, the first TDDI circuit comprising:
   a source driver circuit configured to drive at least a subset of the plurality of display pixels based on a processed image signal, an analog frontend for the capacitive sensing, the analog frontend interfacing with the plurality of capacitive sensing electrodes to obtain a plurality of touch signals and a first image processing circuit configured to generate the processed image signal based on a received image signal and a display parameter;

a second TDDI circuit disposed on the display substrate, the second TDDI circuit comprising a second image processing circuit;

a touch processing circuit configured to generate a touch output signal by processing the plurality of touch signals based on instructions of a touch firmware; and a memory disposed physically separate from the display substrate, the memory storing the display parameter and the touch firmware, wherein the first TDDI circuit is a master TDDI circuit associated with a first section of the display screen and a first section of the sensing region, and wherein the second TDDI circuit is a slave TDDI circuit associated with a second section of the display screen and a second section of the sensing region, and wherein the first TDDI circuit provides the display parameter and the touch firmware to the second TDDI circuit and provides a clock synchronization to the second TDDI circuit.

2. The input-display device of claim 1, wherein the memory is a flash memory.

3. The input-display device of claim 1, further comprising a serial peripheral interface (SPI) between the memory and the first TDDI circuit.

4. The input-display device of claim 1, wherein the display parameter comprises at least one selected from the group consisting of demura data and deburn data.

5. The input-display device of claim 1, wherein the touch firmware is executed directly from the memory.

6. The input-display device of claim 1, wherein the touch processing circuit is disposed in an integrated circuit with the memory.

7. The input-display device of claim 1, further comprising a serial peripheral interface between the master TDDI circuit and the slave TDDI circuit, wherein the slave TDDI circuit receives the display parameters and the touch firmware from the master TDDI circuit via the serial peripheral interface.

8. The input-display device of claim 1, wherein the first image processing circuit and the touch processing circuit are disposed in an integrated circuit with the memory.

9. The input-display device of claim 1, wherein the display screen is an organic light-emitting diode (OLED) display.

10. Input-display device circuitry, comprising:

a first touch and display driver integration (TDDI) circuit disposed on a substrate, the first TDDI circuit comprising:

a source driver circuit configured to drive at least a subset of a plurality of display pixels of a display screen based on a processed image signal, an analog frontend for a capacitive sensing, the analog frontend interfacing with a plurality of capacitive sensing electrodes for capacitive sensing in a sensing region of the display screen, to obtain a plurality of touch signals, and a first image processing circuit configured to generate the processed image signal based on a received image signal and a display parameter;

a second TDDI circuit disposed on the substrate, the second TDDI circuit comprising a second image processing circuit;

a touch processing circuit configured to generate a touch output signal by processing the plurality of touch signals based on instructions of a touch firmware; and a memory disposed physically separate from the substrate, the memory storing the display parameter and the touch firmware, wherein the first TDDI circuit is a master TDDI circuit associated with a first section of the display screen and a first section of the sensing region, wherein the second TDDI circuit is a slave TDDI circuit associated with a second section of the display screen and a second section of the sensing region, and wherein the first TDDI circuit provides the display parameter and the touch firmware to the second TDDI circuit via a peripheral interface and provides a clock synchronization to the second TDDI circuit.

11. The input-display device circuitry of claim 10, wherein the touch processing circuit is disposed in the first TDDI circuit.

12. The input-display device circuitry of claim 10, wherein the display parameter comprises at least one selected from the group consisting of demura data and deburn data.

13. A method of operating an input-display device, comprising:

obtaining a display parameter by a first image processing circuit from a memory;

obtaining a touch firmware by a touch processing circuit from the memory;

generating, by the first image processing circuit, a processed image signal based on a received image signal and the display parameter;

driving, by a source driver circuit, a plurality of display pixels of a display screen based on the processed image signal;

obtaining, by an analog frontend for capacitive sensing, touch signals from a plurality of capacitive sensing electrodes for capacitive sensing in a sensing region of the display screen; and generating, by the touch processing circuit, a touch output signal, by processing the touch signals based on instructions of the touch firmware, wherein the source driver circuit, the first image processing circuit, and the analog frontend are integrated in a first touch and display driver integration (TDDI) circuit disposed on a display substrate associated with the display screen and wherein the first TDDI circuit provides the display parameter and the touch firmware to a second TDDI circuit disposed on the display substrate via a peripheral interface and provides a clock synchronization to the second TDDI circuit, wherein the second TDDI circuit comprises a second image processing circuit, and wherein the memory is disposed physically separate from the display substrate.

14. The method of claim 13, wherein the touch processing circuit is disposed in the first TDDI circuit.

* * * * *